United States Patent
Kaercher et al.

(10) Patent No.: US 12,078,603 B2
(45) Date of Patent: Sep. 3, 2024

(54) METHOD FOR THE DETECTION AND CORRECTION OF LENS DISTORTIONS IN AN ELECTRON DIFFRACTION SYSTEM

(71) Applicant: Bruker AXS, LLC, Madison, WI (US)

(72) Inventors: Joerg Kaercher, Madison, WI (US); Sergey Lazarev, Karlsruhe (DE); Christoph Ollinger, Karlsruhe (DE)

(\*) Notice: Subject to any disclaimer, the term of this patent is extended or adjusted under 35 U.S.C. 154(b) by 0 days.

(21) Appl. No.: 17/220,628

(22) Filed: Apr. 1, 2021

(65) Prior Publication Data

US 2022/0317068 A1  Oct. 6, 2022

(51) Int. Cl.
*G01N 23/04* (2018.01)
*G01N 23/20058* (2018.01)

(52) U.S. Cl.
CPC ....... *G01N 23/20058* (2013.01); *G01N 23/04* (2013.01); *G01N 2223/0565* (2013.01); *G01N 2223/0566* (2013.01)

(58) Field of Classification Search
CPC ............. G01N 23/20058; G01N 23/04; G01N 2223/0565; G01N 2223/0566
See application file for complete search history.

(56) References Cited

PUBLICATIONS

Capitani, G. C., et al., "A practical method to detect and correct for lens distortion in the TEM", Ultramicroscopy 106, 66 (2006).
Meyer, J. C. et al., "The Structure of Suspended Graphene Sheets", Nature 446 (2007) p. 60-63.
Zhou, Jun et al. "Internal lattice relaxation of single-layer graphene under in-plane deformation", Journal of Mechanics and Physics of Solids, 56 (2008) p. 1609-1623.
Verena Kaynig et al., "Fully automatic stitching and distrotion correction of transmission electron microscope images", Journal of Structural Biology, vol. 171, bo. 2, 2010.
Radosav S. Pantelic et al., "The application of graphene as a sample support in transmission electron microscopy", Solid State Communications, vol. 152, No. 15, 2012.

*Primary Examiner* — Jurie Yun
(74) *Attorney, Agent, or Firm* — Benoît & Côté Inc.

(57) ABSTRACT

A method for correcting distortion in a coherent electron diffraction imaging (CEDI) image induced by a projection lens makes use of a known secondary material that is imaged together with a sample of interest. Reflections generated from the secondary material are located in the image, and these observed reflections are used to approximate a beam center location. Using a known lattice structure of the secondary material, Friedel pairs are located in the image and unit cell vectors are identified. Predicted positions for each of the secondary material reflections are then determined, and the position differences between the observed reflections and the predicted reflections are used to construct a relocation function applicable to the overall image. The relocation function is then used to adjust the position of image components so as to correct for the distortion.

14 Claims, 16 Drawing Sheets

```
 #  #Vec  Length      x*        y*        z*
 1    9   0.857    0.94464   0.68417   0.00000
 2   12   0.939   -0.37495   0.99572   0.00000
 3   10   0.939    0.84423  -0.64630   0.00000
 4   12   0.947    0.97925   0.39197   0.00000
 5    8   0.948   -0.62662   0.84740   0.00000
 6    9   0.962    0.12500   1.03119   0.00000
 7    7   0.966    1.01989  -0.16570   0.00000
 8    7   0.976    0.65603   0.78501   0.00000
 9    8   0.977    0.39258   0.94361   0.00000
10   13   0.978    1.01601   0.10045   0.00000
11    2   1.095    0.81310   0.41620   0.00000
12   10   1.109    0.83026  -0.34589   0.00000
13   14   1.120   -0.10480   0.88528   0.00000
14   14   1.128    0.71636   0.51818   0.00000
15    6   1.131    0.64579  -0.60164   0.00000
16    7   1.161    0.48939   0.70749   0.00000
17    9   1.228    0.81025  -0.06589   0.00000
18   11   1.243    0.76913   0.23242   0.00000
19   11   1.252    0.16691   0.77936   0.00000
20   11   1.254   -0.34231   0.71754   0.00000
21    7   1.306    0.75160  -0.13442   0.00000
22    7   1.316    0.60337  -0.45932   0.00000
23    8   1.345    0.47112   0.57286   0.00000
24    6   1.436    0.23282   0.65416   0.00000
25   10   1.629    0.55444  -0.25772   0.00000
26   11   1.651   -0.07374   0.59828   0.00000
27   12   1.716    0.48254   0.32132   0.00000
28   10   1.742    0.53099  -0.21050   0.00000
29    9   1.793   -0.06340   0.55143   0.00000
30    7   1.833    0.54215   0.05075   0.00000
31   10   1.854   -0.31021   0.43963   0.00000
32    7   1.896    0.41361   0.32367   0.00000
33    7   2.054    0.48369   0.01382   0.00000
34   11   2.104    0.18926   0.44377   0.00000
35   13   2.131   -0.31827   0.34068   0.00000
36   12   2.173    0.22864   0.39532   0.00000
37   11   2.190    0.44191   0.10440   0.00000
38    7   2.256   -0.19798   0.39548   0.00000
39    9   3.326    0.27007  -0.12677   0.00000
40   23   3.443   -0.03554   0.28582   0.00000
41   24   3.499    0.22949   0.16606   0.00000
42   15   3.505    0.26013  -0.11151   0.00000

Length of base vectors (pixels) and angles:
283.0
283.3 59.09
288.0 59.71 61.20

Beam center: 1030.(50), 1020.(30)
```

FIGURE 7B

```
Indexed reflections (domain 1):
 H  K  L  L    X     Y
 1 -1  0  0  1064  1349
 1  0 -1  0  1333  1156
 0  1 -1  0  1297   825
-1  1  0  0   990   608
-1  0  1  0   721   890
 0 -1  1  0   789  1312
 2 -1 -1  0  1354  1464
 1  1 -2  0  1574   964
-1  2 -1  0  1347   521
-2  1  1  0   698   873
 1 -2  1  0   808  1520
 2 -2  0  0  1098  1635
 2  0 -2  0  1596  1274
 0  2 -2  0  1525   660
-2  2  0  0   954   407
-2  0  2  0   455   763
 0 -2  2  0   523  1381
 3 -2 -1  0  1357  1707
-1 -2  3  0   303  1238
 1 -3  2  0   601  1641
 2 -3  1  0   865  1758
 3 -1 -2  0  1585  1539
 1  2 -3  0  1748   804
-1  3 -2  0  1451   407
-2  3 -1  0  1187   291
 2  1 -3  0  1781  1088
-2 -1  3  0   267   951
-3  1  2  0   462   500
-3  2  1  0   692   339
 3 -3  0  0  1125  1828
 3  0 -3  0  1771  1354
 0  3 -3  0  1674   550
-3  3  0  0   927   220
-3  0  3  0   274   608
 0 -3  3  0   375  1496
 4 -2 -2  0  1541  1715
 2  2 -4  0  1872   936
-2  4 -2  0  1357   251
-4  2  2  0   506   329
-2 -2  4  0   172  1107
 2 -4  2  0   693  1805

Beam center: 1025.7(16), 1022.(2)
```

FIGURE 7C

```
Observed ratios (domain 1):
 H  K  I  L    X    Y   Angle    Ratio
 1 -1  0  0  1064 1349  -83.2  1.13097
 1  0 -1  0  1333 1155  -23.5  1.14975
 0  1 -1  0  1297  815   35.9  1.14592
-1  1  0  0   990  688   96.0  1.14576
-1  0  1  0   721  880  155.1  1.14638
 0 -1  1  0   759 1212 -144.4  1.12125
 2 -1 -1  0  1354 1464  -53.4  1.09108
 1  1 -2  0  1574  964    5.9  1.09098
-1  2 -1  0  1247  521   66.1  1.07979
-2  1  1  0   698  573  126.2  1.08626
 1 -2  1  0   908 1520 -113.6  1.07466
 2 -2  0  0  1098 1635  -83.3  1.05703
 2  0 -2  0  1596 1274  -23.9  1.06761
 0  2 -2  0  1525  660   35.9  1.06582
-2  2  0  0   954  407   96.6  1.05718
-2  0  2  0   455  763  155.7  1.07020
 0 -2  2  0   528 1381 -144.1  1.04954
 3 -2 -1  0  1357 1707  -64.2  0.98509
-1 -2  3  0   302 1238 -163.4  0.97713
 1 -3  2  0   601 1641 -124.4  0.97155
 2 -3  1  0   865 1758 -102.3  0.97503
 3 -1 -2  0  1585 1539  -42.8  0.98682
 1  2 -3  0  1748  804   16.7  0.97599
-1  3 -2  0  1451  407   55.3  0.96678
-2  3 -1  0  1187  291   77.5  0.96793
 2  1 -3  0  1761 1088   -5.1  0.98201
-2 -1  3  0   267  951  174.7  0.98530
-3  1  2  0   462  500  137.2  0.99263
-3  2  1  0   692  339  116.1  0.98287
 3 -3  0  0  1125 1828  -83.0  0.93728
 3  0 -3  0  1771 1354  -24.0  0.93170
 0  3 -3  0  1674  550   36.0  0.91438
-3  3  0  0   827  220   97.0  0.92119
-3  0  3  0   274  685  155.9  0.93863
 0 -3  3  0   375 1496 -143.9  0.91864
 4 -2 -2  0  1541 1715  -53.4  0.85411
 2  2 -4  0  1872  936    5.7  0.84070
-2  4 -2  0  1357  251   66.7  0.82887
-4  2  2  0   506  329  126.9  0.85550
-2 -2  4  0   173 1107 -174.2  0.84775
 2 -4  2  0   692 1805 -113.0  0.84195
```

FIGURE 7D

```
f(x, y) = a + b*h(x, y) + c * sin(2*g(x, y) + d)
   with: g(x, y) = arctan2(y-cy, x-cx)
         h(x, y) = ((x-cx)**2 + (y-cy)**2) ** 0.5
   start:     a =      1.00(10)
              b =      0.00(10)
              c =      0.15(10)
             cx =   1025.74(10)
             cy =   1021.63(10)
              d =      0.00(10)
   fit:       a =      1.167(12)
              b =     -0.00009(3)
              c =     -0.017(2)
             cx =   1021.(3)
             cy =   1025.(3)
              d =     -0.36(15)
```

FIGURE 7E

Fitted ratios (domain 1):

| H | K | I | L | X | Y | Angle | Ratio | Fit |
|---|---|---|---|---|---|---|---|---|
| 1 | -1 | 0 | 0 | 1059 | 1311 | -82.3 | 1.13528 | 0.99621 |
| 1 | 0 | -1 | 0 | 1392 | 1138 | -23.7 | 1.15080 | 0.99908 |
| 0 | 1 | -1 | 0 | 1266 | 847 | 35.8 | 1.12218 | 1.02116 |
| -1 | 1 | 0 | 0 | 994 | 728 | 95.1 | 1.13258 | 1.01164 |
| -1 | 0 | 1 | 0 | 761 | 899 | 154.2 | 1.15239 | 0.99482 |
| 0 | -1 | 1 | 0 | 788 | 1191 | -144.4 | 1.12452 | 0.99709 |
| 2 | -1 | -1 | 0 | 1322 | 1422 | -52.8 | 1.10637 | 0.98618 |
| 1 | 1 | -2 | 0 | 1527 | 969 | 6.2 | 1.09359 | 0.99762 |
| -1 | 2 | -1 | 0 | 1230 | 558 | 65.8 | 1.07743 | 1.00219 |
| -2 | 1 | 1 | 0 | 728 | 616 | 125.6 | 1.10516 | 0.99198 |
| 1 | -2 | 1 | 0 | 824 | 1482 | -113.2 | 1.08165 | 0.99353 |
| 1 | -2 | 0 | 0 | 1093 | 1598 | -82.7 | 1.06676 | 0.99088 |
| 1 | 0 | -2 | 0 | 1554 | 1258 | -23.4 | 1.07837 | 0.99082 |
| 0 | 2 | -2 | 0 | 1500 | 678 | 35.8 | 1.05177 | 1.00385 |
| -2 | 2 | 0 | 0 | 959 | 444 | 96.1 | 1.06356 | 0.99401 |
| -2 | 0 | 2 | 0 | 498 | 783 | 155.2 | 1.08112 | 0.98990 |
| 0 | -2 | 2 | 0 | 596 | 1361 | -144.1 | 1.05895 | 0.99111 |
| 3 | -2 | -1 | 0 | 1365 | 1721 | -63.7 | 0.97860 | 1.00663 |
| -1 | -2 | 3 | 0 | 294 | 1243 | -163.5 | 0.97657 | 1.00057 |
| 1 | -3 | 2 | 0 | 587 | 1662 | -124.2 | 0.96698 | 1.00473 |
| 2 | -3 | 1 | 0 | 860 | 1782 | -102.0 | 0.96842 | 1.00682 |
| 3 | -1 | -2 | 0 | 1595 | 1548 | -42.3 | 0.98247 | 1.00442 |
| 1 | 2 | -3 | 0 | 1773 | 797 | 16.8 | 0.96638 | 1.00994 |
| -1 | 3 | -2 | 0 | 1469 | 381 | 55.1 | 0.96020 | 1.00685 |
| -2 | 3 | -1 | 0 | 1193 | 264 | 77.2 | 0.96522 | 1.00281 |
| 2 | 1 | -3 | 0 | 1801 | 1090 | -4.8 | 0.97517 | 1.00701 |
| -2 | -1 | 3 | 0 | 253 | 950 | 174.5 | 0.98225 | 1.00311 |
| -3 | 1 | 2 | 0 | 452 | 489 | 136.7 | 0.98090 | 1.01195 |
| -3 | 2 | 1 | 0 | 684 | 323 | 115.6 | 0.97850 | 1.00446 |
| 3 | -3 | 0 | 0 | 1135 | 1902 | -82.6 | 0.81502 | 1.01339 |
| 3 | 0 | -3 | 0 | 1836 | 1352 | -23.7 | 0.82025 | 1.01244 |
| 0 | 3 | -3 | 0 | 1741 | 501 | 36.0 | 0.80674 | 1.00843 |
| -3 | 3 | 0 | 0 | 918 | 145 | 96.6 | 0.81463 | 1.00718 |
| -3 | 0 | 3 | 0 | 210 | 656 | 155.6 | 0.82114 | 1.01899 |
| 0 | -3 | 3 | 0 | 316 | 1539 | -143.9 | 0.91645 | 1.00239 |
| 4 | -2 | -2 | 0 | 1628 | 1832 | -53.0 | 0.85569 | 0.99815 |
| 2 | 2 | -4 | 0 | 2013 | 922 | 5.9 | 0.85771 | 0.98018 |
| -2 | 4 | -2 | 0 | 1414 | 122 | 66.4 | 0.85729 | 0.96684 |
| -4 | 2 | 2 | 0 | 418 | 210 | 126.5 | 0.85464 | 1.00101 |
| -2 | -2 | 4 | 0 | 37 | 1121 | -174.4 | 0.86332 | 0.98197 |
| 2 | -4 | 2 | 0 | 635 | 1940 | -112.8 | 0.85303 | 0.98704 |

FIGURE 7F

METHOD FOR THE DETECTION AND CORRECTION OF LENS DISTORTIONS IN AN ELECTRON DIFFRACTION SYSTEM

BACKGROUND OF THE INVENTION

Field of the Invention

This invention relates generally to the field of electron diffraction and, more specifically, to the correction of lens distortions in an electron diffraction system.

Description of the Related Art

Coherent electron diffraction imaging (CEDI) is a technique for 2D or 3D reconstruction of nanoscale objects such as nanotubes, nanocrystals, proteins, and more. A highly coherent beam of electrons is incident on a specimen, which gives rise to diffraction images that are recorded using an active pixel array sensor. The specimen is supported by a material that is highly translucent to electrons in the desired energy range from 10-30 keV, such as graphene or a thin film of silicon nitride. In some cases, the specimen can support itself, such as a freestanding carbon nanotube. The entire beam path, from the electron gun to the detector, is situated in high or ultra-high vacuum.

In a typical CEDI system, the electron beam path includes electrostatic and magnetic lenses that shape the beam and determine its properties, such as beam size and beam divergence, while at the same time minimizing chromatic and spherical aberrations that deteriorate the beam coherence and impede the formation of a diffraction image. On the secondary side (after diffraction by the specimen), a magnetic projection lens is used for magnifying the diffraction image on the detector. However, distortions are often introduced in the CEDI image by the projection lens, and need to be corrected before a reconstruction can be attempted.

In conventional CEDI systems, the specimen is reconstructed from the diffraction data using a number of recursive methods, such as Error Reduction (ER) and Hybrid-Input-Output (HIO). These dual-space methods alternate between using reciprocal space and real space, and the reconstruction depends on the accuracy of the data. Simulations show that the perturbations introduced by the projection lens distortion can often prevent a successful reconstruction. FIG. 1A shows a simulated CEDI image of a double-walled carbon nanotube (DWCNT) along the tube axis. FIG. 1B depicts a successful reconstruction of the DWCNT from the simulated data. FIGS. 1C-1F, however, show different failed reconstructions using the simulated data after applying a projection lens distortion from experimental CNT data.

With lens distortions in optical systems, one classically distinguishes between pincushion, barrel, and spiral distortion. Examples of such distortions were depicted in G. C. Capitani, et al., *A practical method to detect and correct for lens distortion in the TEM*, Ultramicroscopy 106, 66 (2006), and those depictions are reproduced herein as FIGS. 2A-2E. FIG. 2A represents an undistorted image of an object. FIG. 2B shows how a pincushion-type distortion involves magnification that increases with distance from the center and depends on the direction in which it is measured. FIG. 2C depicts a barrel-type distortion, in which magnification decreases with distance from the center. FIG. 2D is a representation of a spiral distortion, for which a straight line is imaged as a sigmoidal shape. Finally, FIG. 2E shows an elliptical distortion, for which the magnification is different in different radial directions. With pincushion and barrel distortion, the magnitude of the distortion is proportional to the radial distance from the beam center. In its simplest form (represented below by Equation (1)), the distortion scales linearly with the distance, but higher order dependencies are common as well.

$$f_{radial}(x, y) = a + b * \sqrt{(x-c_x)^2 + (y-c_y)^2} \tag{1}$$

In the aforementioned work by Capitani, et al., it was determined that the most relevant distortion in a transmission electron microscope (TEM) is the elliptical distortion, represented below by Equation (2).

$$f_{ellipse}(x,y) = a + b * \sin\left(\tan^{-1}\left(\frac{y-c_y}{x-c_x}\right) + d\right) \tag{2}$$

Detection and correction of the projection lens distortion requires a pattern of fiducial markers from which the coefficients for the radial and elliptical distortion can be derived. Capitani et al. used diffraction patterns from 3D crystals such as vesuvianite to detect and correct the lens distortions of a TEM before the actual specimen is introduced.

However, additional measures are necessary to minimize the deleterious impact of such lens distortions in modern CEDI instruments.

SUMMARY OF THE INVENTION

In accordance with the present invention, a method is provided for correcting a distortion imparted to a diffraction image of a sample of interest by a projection lens in a coherent electron diffraction imaging (CEDI) system. The method involves first obtaining a CEDI image of the sample of interest together with a secondary material having a known lattice structure. Observed positions of reflections corresponding to the secondary material are then located in the image. Based on the relative locations of the observed reflections, and by knowing the nature of the secondary material, the unit cell vectors associated with the secondary material are then identified.

Using the unit cell vectors, a predicted position for each of the secondary material reflections is determined, the predicted positions corresponding to a respective Bravais-Miller index assigned to each of the reflections based on the unit cell vectors and the known lattice structure of the secondary material. Using the differences between the observed positions and the predicted positions of the secondary material reflections, the positions of image components within the CEDI image are then relocated.

In an exemplary embodiment of the invention, the secondary material is graphene, although other materials may also be used. This embodiment also involves identifying the unit cell vectors of the secondary material by first finding difference vectors for pairs of the observed CEDI reflections corresponding to the secondary material. These difference vectors are then grouped according to length and direction, with the vectors of each group being averaged. The shortest averaged group vectors having a similar length are then selected as the unit cell vectors. The predicted position of each secondary material reflection may then be determined by finding a linear combination of the unit cell vectors that corresponds to a position in the image proximate to the observed position of that reflection.

In the exemplary embodiment, the differences between the observed positions and the predicted positions of the secondary material reflections are found relative to a beam center location in the image. The beam center location may be determined by averaging centroids of reflection pairs using the observed positions of the secondary material reflections. The beam center location may then be used as a reference point in the characterization of the distortion in the image. In particular, for each secondary material reflection, a ratio may be found between a distance of the observed reflection to the beam center location and a distance of the predicted reflection to the beam center location. These ratios may then be used in the distortion characterization.

The lens distortion may be represented by a transform function indicative of how image components are displaced in the CEDI image relative to what would be their correct locations in the image. The relevant coefficients of this function may be determined from the observed secondary material reflection positions and the distance ratios relating the respective distances between the observed and predicted positions of the secondary material reflections. Such a function may then be used to adjust the image on a pixel-by-pixel basis, which corrects not only the information associated with the secondary material, but that corresponding to the sample as well. In the exemplary embodiment, this function is as follows:

$$f(x, y) = a + b * \sqrt{(x-c_x)^2 + (y-c_y)^2} + c * \sin\left(2 * \tan^{-1}\left(\frac{y-c_y}{x-c_x}\right) + d\right)$$

where $c_x$ and $c_y$ represent the x and y coordinates of the beam center location, and a, b, c and d represent the additional coefficients that are determined, as described above, from the observed positions and distance ratios of the secondary material reflections. The coefficients may be found by fitting the above equation to the observed positions and distance ratios of the secondary material. Such a fitting may make use, for example, of a least squares refinement process. The coefficients in the equation are then replaced by the values found during the fitting process to provide a transform function that may be used in correcting the lens distortion.

BRIEF DESCRIPTION OF THE DRAWINGS

FIG. 7B is a table of the measured reflection data for the image of FIG. 7A.

FIG. 7C is a table of the predicted reflections for the image of FIG. 7A.

FIG. 7D is a table of the distance ratios for the reflections in the image of FIG. 7A.

FIG. 7E shows the coefficient fitting for a distortion characterization equation associated with the image of FIG. 7A.

FIG. 7F is a table showing the fitted distance ratios for the reflections in the image of FIG. 7A.

DETAILED DESCRIPTION

Figure 1A:
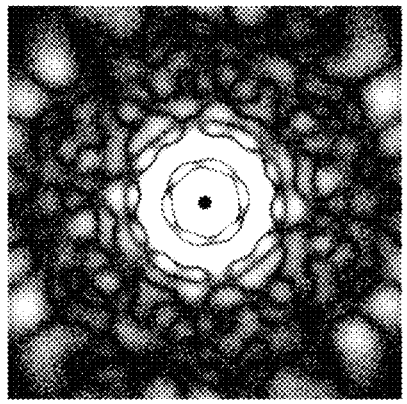
FIG. 1A shows a simulated CEDI image of a double-walled carbon nanotube (DWCNT) along the tube axis.
Figure 1B:
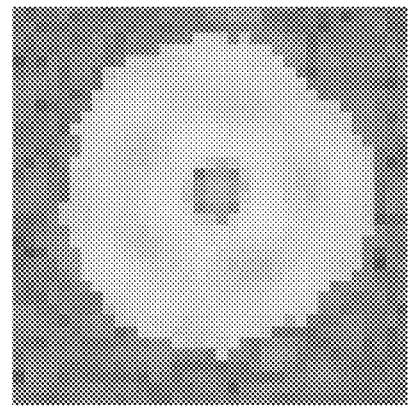
FIG. 1B depicts a successful reconstruction of the DWCNT of FIG. 1A from the simulated data.
Figure 1C:
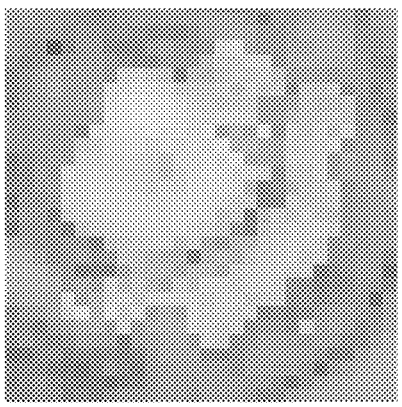
FIG. 1C depicts a first failed reconstruction of the DWCNT of FIG. 1A using the simulated data after applying a projection lens distortion from experimental carbon nanotube (CNT) data.
Figure 1D:
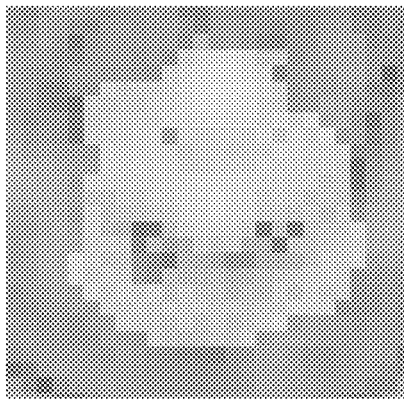
FIG. 1D depicts a second failed reconstruction of the DWCNT of FIG. 1A using the simulated data after applying a projection lens distortion from experimental CNT data.
Figure 1E:
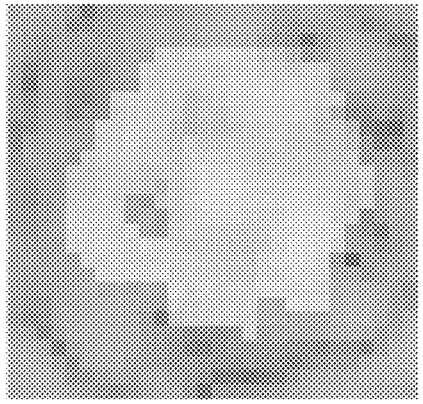
FIG. 1E depicts a third failed reconstruction of the DWCNT of FIG. 1A using the simulated data after applying a projection lens distortion from experimental CNT data.
Figure 1F:
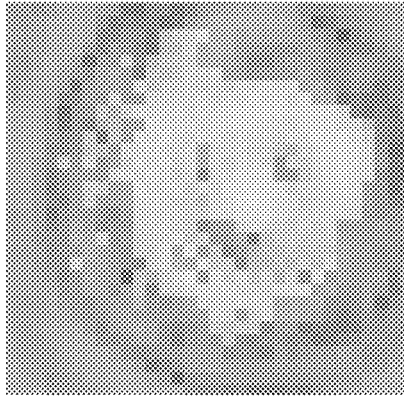
FIG. 1F depicts a fourth failed reconstruction of the DWCNT of FIG. 1A using the simulated data after applying a projection lens distortion from experimental CNT data.
Figure 2A:
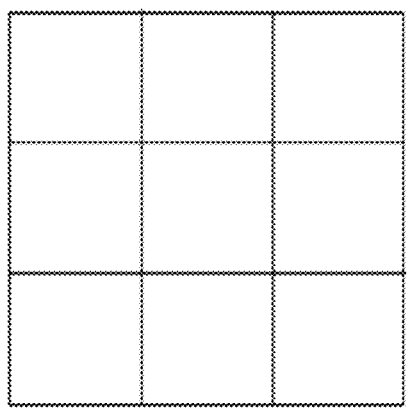
FIG. 2A is a schematic representation of an undistorted image of an object according to the prior art.
Figure 2B:
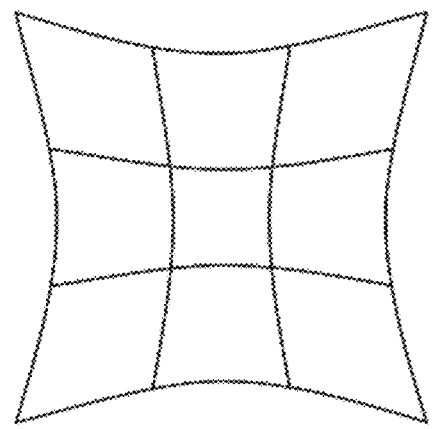
FIG. 2B is a schematic representation of the object shown in FIG. 2A that has been subjected to a pincushion-type distortion.
Figure 2C:
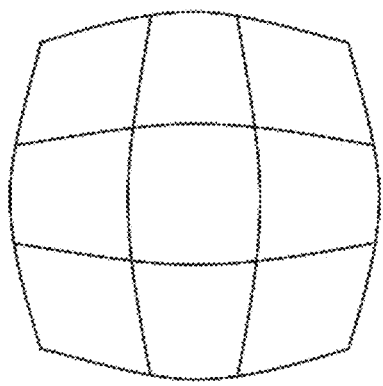
FIG. 2C is a schematic representation of the object shown in FIG. 2A that has been subjected to a barrel-type distortion.
Figure 2D:
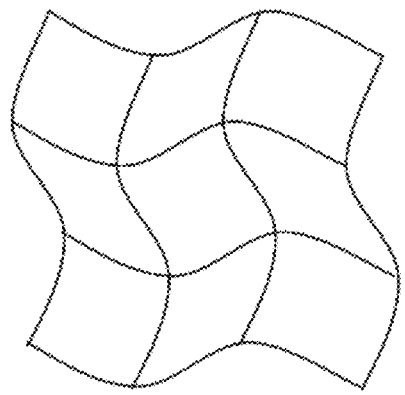
FIG. 2D is a schematic representation of the object shown in FIG. 2A that has been subjected to a spiral distortion.
Figure 2E:
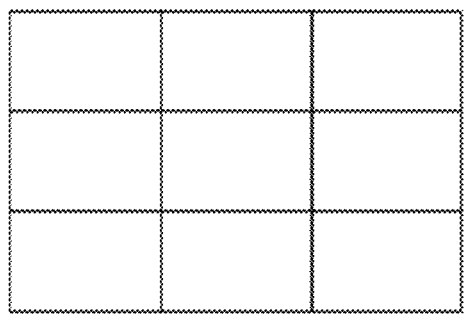
FIG. 2E is a schematic representation of the object shown in FIG. 2A that has been subjected to shows an elliptical distortion.
Figure 3:
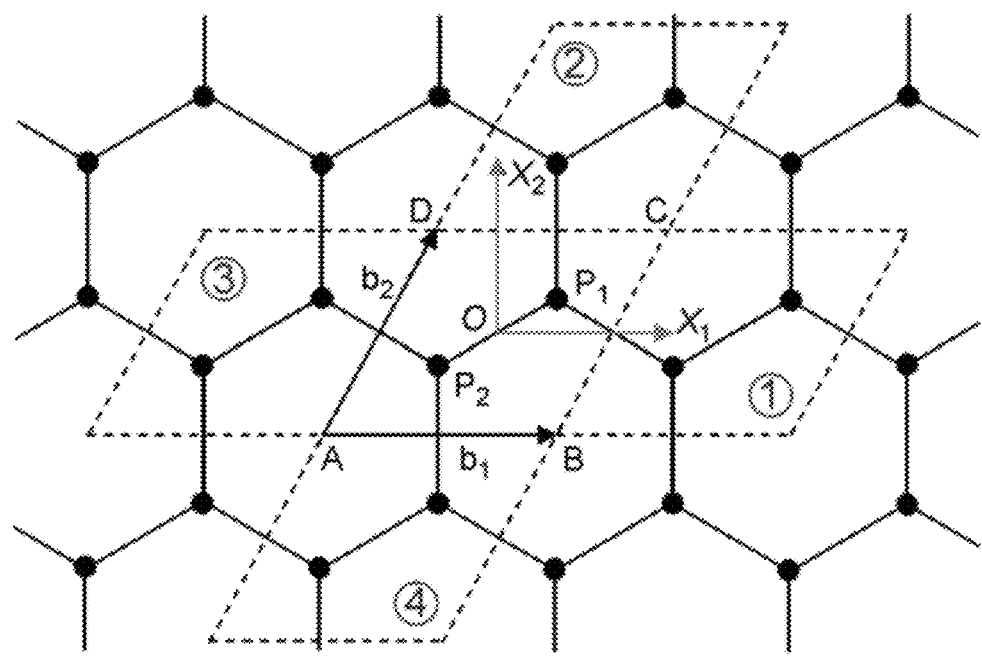
FIG. 3 is a schematic representation of a hexagonal lattice of graphene, with a rhombic unit cell ABCD.
Figure 4:
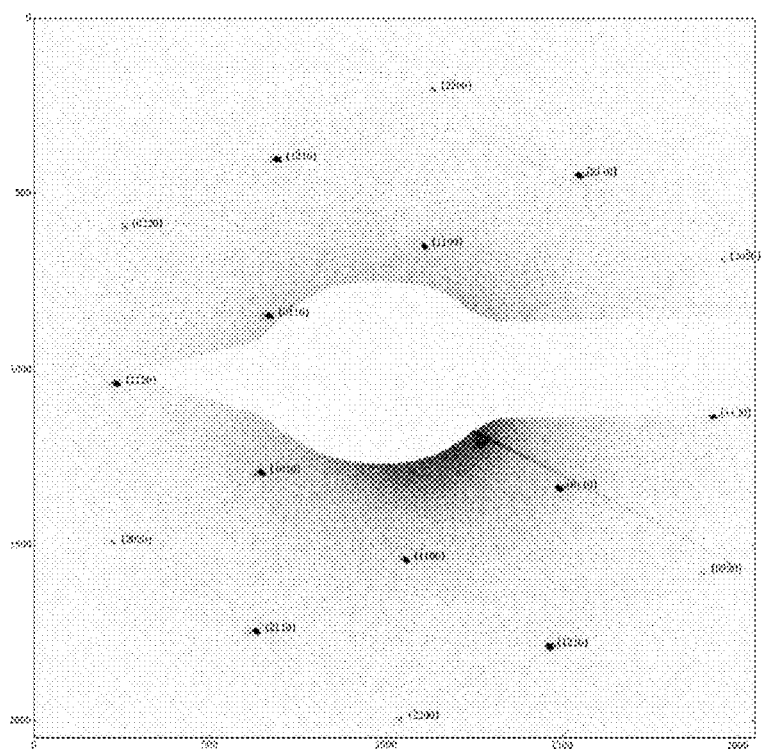
FIG. 4 is an example CEDI image of graphene.

The present invention makes use of Bragg diffraction peaks from a secondary material such as graphene for identifying and correcting for CEDI lens distortion errors. In many CEDI experiments, graphene is used as a support for the specimen under test, as it is highly translucent to low energy electrons. Graphene is an allotrope of carbon in the form of a single layer of atoms in a 2D hexagonal lattice, in which one atom forms each vertex. An example of the hexagonal lattice of graphene is shown in FIG. 3, with the rhombic unit cell ABCD and four neighboring cells being denoted by the numbers 1, 2, 3 and 4 in circles. Graphene is also the basic structural element of other allotropes, including carbon nanotubes. The rhombic unit cell of graphene contains two chemically identical carbon atoms, labeled P1 and P2 in FIG. 3, and has unit cell dimensions b1=b2=2.46 Å. Graphene has lattice symmetry p6m. An example CEDI image of graphene is shown in FIG. 4.

From the hexagonal symmetry, the relative distances of the reflections from the beam center can be derived from their Bravais-Miller indices, as shown below in Equation (3). The ratio between the observed distances and the distances predicted from the symmetry provide input for determining the distortion parameters.

$$d_{rel,hexagonal}(h, k) = \sqrt{h^2+k^2+h*k} \quad (3)$$

As a 2D crystal, the Bragg reflections of graphene in reciprocal space, instead of spheroids as for 3D crystals, are cones (rods for idealized flat graphene). Consequently, the Bragg condition is fulfilled for all reflections at any incidence angle of the electron beam on the graphene, obviating the need to carefully align the graphene with the beam, as is the case with 3D crystals.

For 3D reconstructions, where the incidence angle changes continuously during the tomographic scan, the graphene reflections move away from the scan axis with increasing acuteness of the angle of incidence. This spreads out the reflections on the detector surface and allows for the sampling of different regions of the distortion function, which in turn allows for a more precise determination of the distortion parameters. This is demonstrated in FIGS. 5A-5E.

Figure 5A:
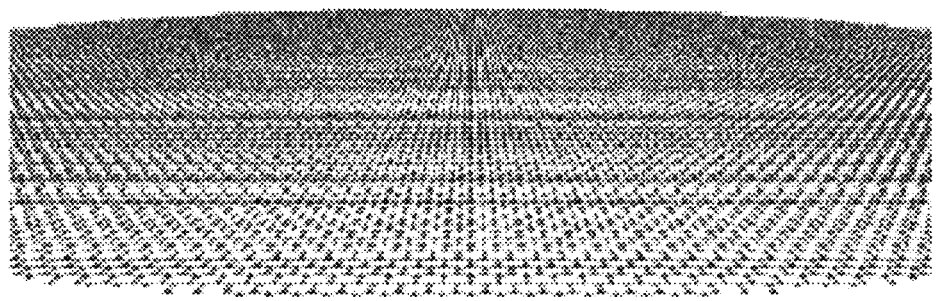
FIG. 5A is a perspective view of flat graphene in real space.
Figure 5B:
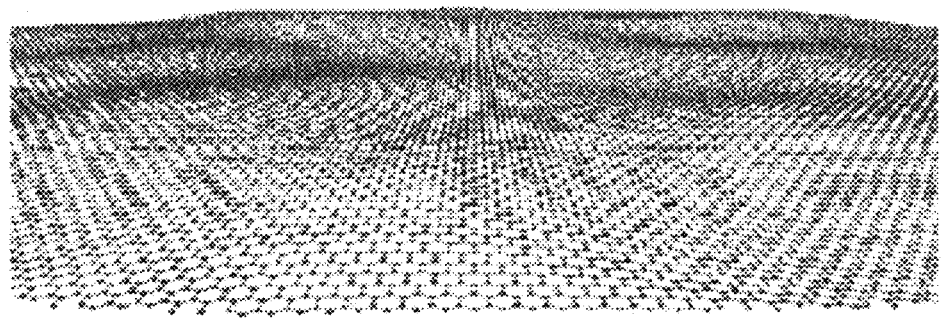
FIG. 5B is a perspective view of corrugated graphene in real space.
Figure 5C:
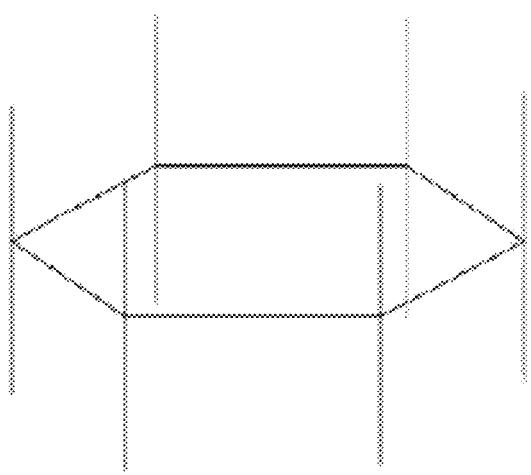
FIG. 5C is a schematic depiction of the reciprocal space for a flat graphene sheet.
Figure 5D:
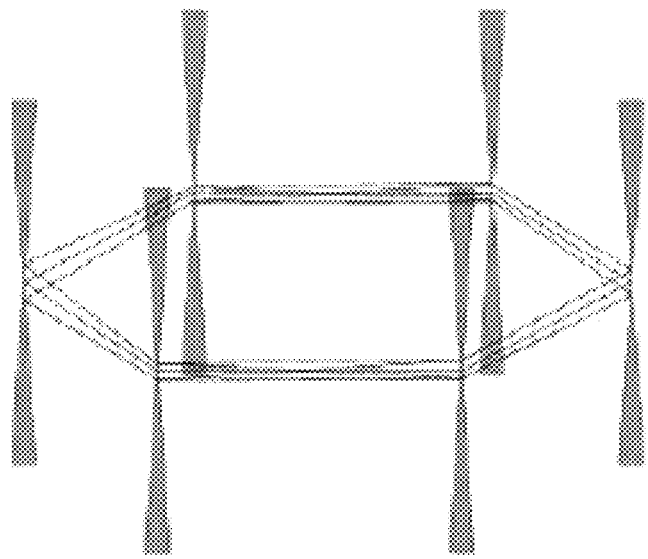
FIG. 5D is a schematic depiction of the reciprocal space for a corrugated graphene sheet.
Figure 5E:
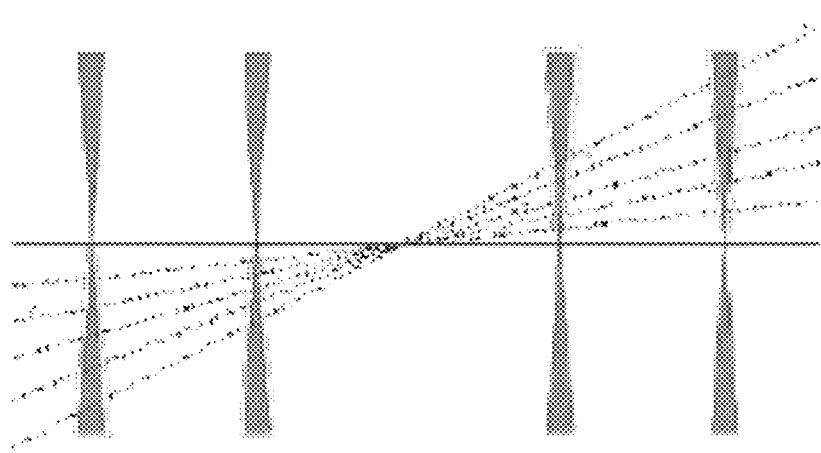
FIG. 5E is a schematic depiction indicating how, for a corrugated graphene sheet, the diffraction spots become blurred at large angles.

FIGS. 5A-5E show the characteristics of flat and corrugated graphene sheets as described in J. C. Meyer et al., *The Structure of Suspended Graphene Sheets*, Nature 446 (2007) 60-63. FIG. 5A is a perspective view of flat graphene in real space, while FIG. 5B is a similar view of corrugated graphene. FIG. 5C shows the reciprocal space for a flat graphene sheet which, as indicated, is a set of rods oriented perpendicularly to the hexagonal reciprocal lattice of graphene. FIG. 5D shows how, for a corrugated graphene sheet, a superposition of diffracting beams from microscopic flat areas effectively turns the perpendicular rods of FIG. 5C into cone-shaped volumes. As a result, the diffraction spots from such a surface become blurred at large angles, as indicated by the dotted lines in FIG. 5E. Moreover, this effect is more pronounced further away from the tilt axis.

Figure 6A:
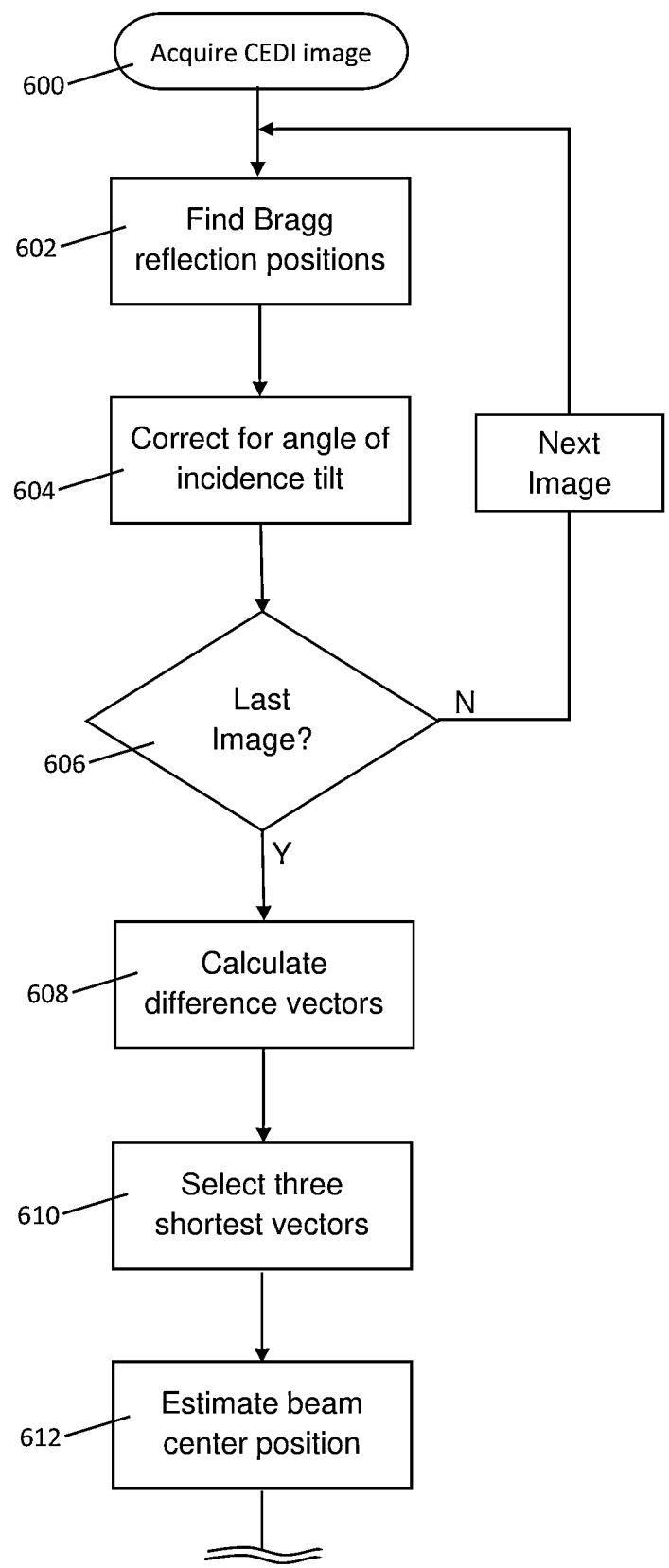
FIG. 6A is a first section of a flow diagram of a method according to the invention.
Figure 6B:
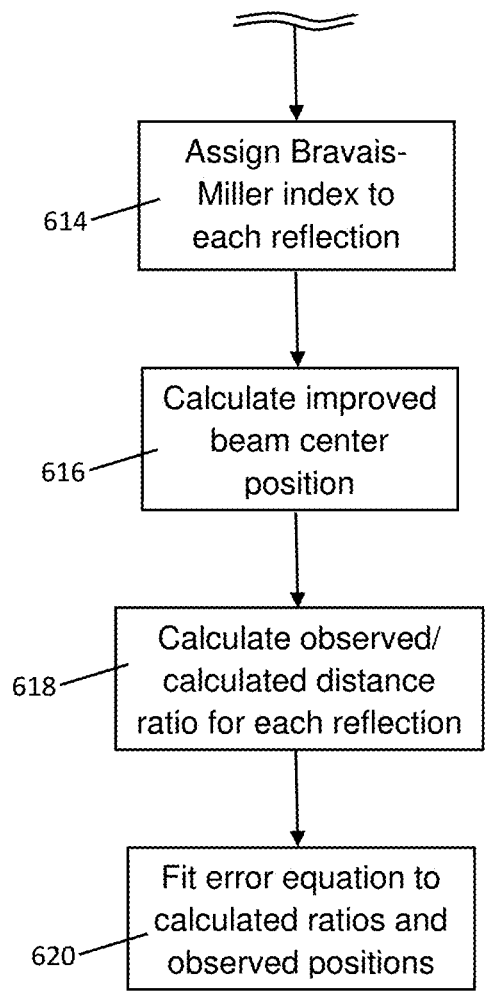
FIG. 6B is the second section of the flow diagram of FIG. 6A.

The present invention uses the measured CEDI images of graphene as part of a method for identifying and compensating for lens distortions such as those described above. An exemplary embodiment of this method is outlined in the steps shown in FIGS. 6A and 6B. This embodiment may be applied, for example, as part of a CEDI measurement for which one or more samples of interest are mounted on a graphene support surface.

The method begins with the acquisition of a CEDI image in step 600. In step 602, the Bragg reflection positions of the graphene are located in the CEDI image. This may be done manually by a user visually identifying the reflections, and noting their pixel positions in the overall image. Alternatively, an automated procedure, such as a blob-detection method (e.g., connected-component labeling) may be applied. In general, a manual approach works best for images that also contain diffraction data from the specimen, or if multiple graphene domains are present.

In step 604, a correction for the angle of incidence tilt of the electron beam with respect to the graphene sheet is applied. This may be done by modifying the image so that the reflection positions are closer by a factor of 1/cosφ to the projection of the scan axis onto the image, with φ=0° for perpendicular incidence. Although the invention may make use of only one image, it is also possible to use a set of images taken using different angles of incidence. As discussed above with regards to FIGS. 5A-5E, the different angles of incidence allow for sampling of different regions of the distortion function, and can improve the determination of the distortion parameters. Thus, the method shown in FIGS. 6A and 6B includes the possibility of repeating Steps 602 and 604 for each of the images that might be used, as indicated by decision branch (step 606) that accounts for all of the different images that may be desired.

Once the graphene reflection positions for each image are located and corrected as described above, the difference vectors for all reflection pairs of each image are calculated (step 608). The difference vectors are grouped according to their length and direction using threshold criteria specified for limiting the maximum fractional deviation of vector lengths for grouping and the maximum angular deviation from collinearity for vectors within a group. An average difference vector for each group is then calculated.

In step 610, the three shortest group difference vectors are found, and those vectors will form the hexagonal lattice. The vectors should be similar in length, and oriented at angles of 60° relative to one another. The two vectors that are most closely similar in length are selected, and those vectors will be the unit cell vectors in reciprocal space. The beam center position ($c_x$, $c_y$) is then estimated by calculating the center of gravity of all of the reflection positions (step 612).

A Bravais-Miller index is assigned to each reflection (step 614) by finding the best linear combination of the two unit cell vectors from the beam center to the observed reflection position. In the preferred embodiment of the invention, the Ewald sphere curvature is neglected and approximated as a plane. This is a valid approximation given that the de Broglie wavelength of the electrons is very small, and the diffraction angles of the observed reflections are very low. An improved beam center position is then calculated by averaging over the centroids of all Friedel pairs of the observed reflections (step 616).

For each reflection, the ratio of the observed and calculated distance to the beam center is then determined (step 618). Using Equation (3) above, the distance between the observed position of each reflection and the beam center is determined, as is the distance between the calculated position of each reflection and the beam center. For each reflection, the ratio between these two values is then found and recorded.

In step 620, Equation (4) shown below is fit to the calculated ratios and observed reflection pixel positions (x,y) to determine a set of coefficients a, b, c, d, $c_x$ and $c_y$.

$$\begin{aligned}f(x, y) &= f_{radial}(x, y) + f_{ellipse}(x, y) \quad (4)\\ &= a + b*\sqrt{(x-c_x)^2 + (y-c_y)^2} + c*\sin\left(2*\tan^{-1}\left(\frac{y-c_y}{x-c_x}\right) + d\right)\end{aligned}$$

The coefficients define the type and magnitude of the distortion indicated by the errors in the distances of the reflections from the beam center. The values $c_x$ and $c_y$ represent the coordinates of the beam center, and the values a, b, c, d provide different respective information regarding the nature of the distortion itself. These are defined herein as follows: 1) "a" represents an average magnification factor; 2) "b" represents a radial distortion coefficient; 3) "c" represents an elliptical distortion coefficient; and 4) "d" represents an ellipse inclination angle. Thus, by finding the magnitudes of these coefficients, an indication of the type of distortion being created by the projection lens may be determined. Moreover, knowing these values allows for a correction to be applied to the image data of a sample that has been shown to significantly improve the data quality.

The fitting process using Equation (4) may be according to a known fitting technique and, in the present embodiment, is a least squares refinement. The values for $c_x$ and $c_y$ found in step 616 are used, and starting values for the coefficients a, b, c and d are chosen empirically. In this embodiment, starting values of a=1, b=0 and d=0 are chosen. The starting value of c is the largest distance ratio found in step 618. Those skilled in the art will understand that, although values for the beam center coordinates $c_x$, $c_y$ were obtained previously, these values are refined together with the coefficients a, b, c, d during the fitting process, which improves the overall result.

Once the coefficients are found, the equation may be used as a general tool for correcting the distortion in a CEDI image, affecting both image components related to the secondary material, e.g., graphene, and image components related to a sample under test. In this context, Equation (4) may be used as a transform function to restructure the image on a pixel-by-pixel basis. In applying the equation, a, b, c, d, $c_x$ and $c_y$ are replaced with the actual values determined during the fitting process, and revised x and y values can be calculated for any pixel location as follows:

$$x_{rev} = (x - c_x)/f(x, y) + c_x \quad (5)$$

$$y_{rev} = (y - c_y)/f(x, y) + c_y \quad (6)$$

where ($x_{rev}$, $y_{rev}$) is the revised pixel position, (x, y) is the original pixel position, and the distortion factor f(x,y) is the evaluation of Equation (4) at the original pixel position using the coefficients determined in the fitting process.

Figure 7A:
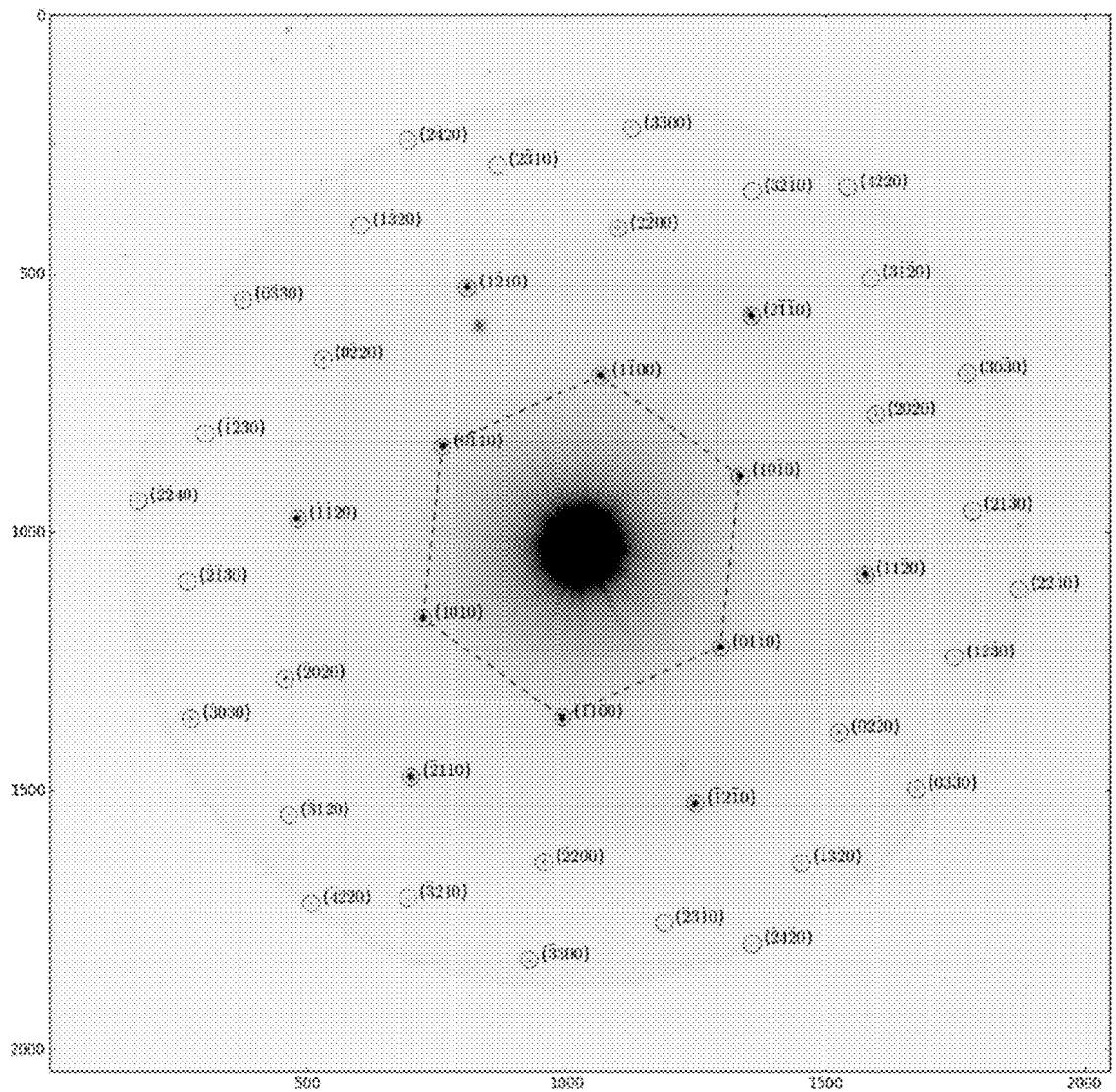
FIG. 7A depicts a CEDI image of graphene like that of FIG. 4, but showing the material lattice structure.

FIG. 7A shows a CEDI image of graphene, similar to that of FIG. 4, but without the presence of a beam stop. The location of many or all of the different reflections shown in the figure may have a position error due to a projection lens distortion. The image was obtained using a perpendicular angle of incidence, and no correction for angle of incidence is therefore necessary. From the measured distance vectors of all pairs of reflections in the image, the shortest are found to be associated with the two unit cell vectors that define the hexagonal lattice and are also among the most frequently occurring. The unit cell vectors will be at an approximately 60° angle relative to each other. Of the reflections shown connected in the figure by dashed lines, the distance vectors from the beam center to any two neighboring reflections form a valid set of unit cell vectors.

The measured reflection data for the image shown in FIG. 7A is presented in the table of FIG. 7B. The table shows a list of all of the measured difference vectors and, at the bottom, the length (in pixels) of the shortest three vectors is indicated, along with their relative angles. As shown, the three vectors are similar in length, and have angles relative to each other of approximately 60°. Two of these have a closely similar length (283.0 and 283.3 pixels, respectively), and these will represent the unit vectors for the graphene material. Also shown in the table are the coordinates of the beam center (1030, 1020), determined by finding the center of gravity of all observed reflection positions.

Once the unit vectors are determined, the Bravais-Miller indices may be assigned to the observed reflections, as shown in the table of FIG. 7C. An improved value for the beam center is found by averaging over the centroids of all Friedel pairs of observed reflections found from the indexing step. For each reflection, a predicted position from the updated value for the beam center can then be found using Equation (3), which relies on the symmetry properties of the graphene crystal to make an accurate calculation that is less affected by distortion than the observed reflection positions.

The ratio between the calculated distances of observed reflections to the beam center and the distances of predicted reflections to the beam center is then determined, as shown in the table of FIG. 7D.

Figure 8:
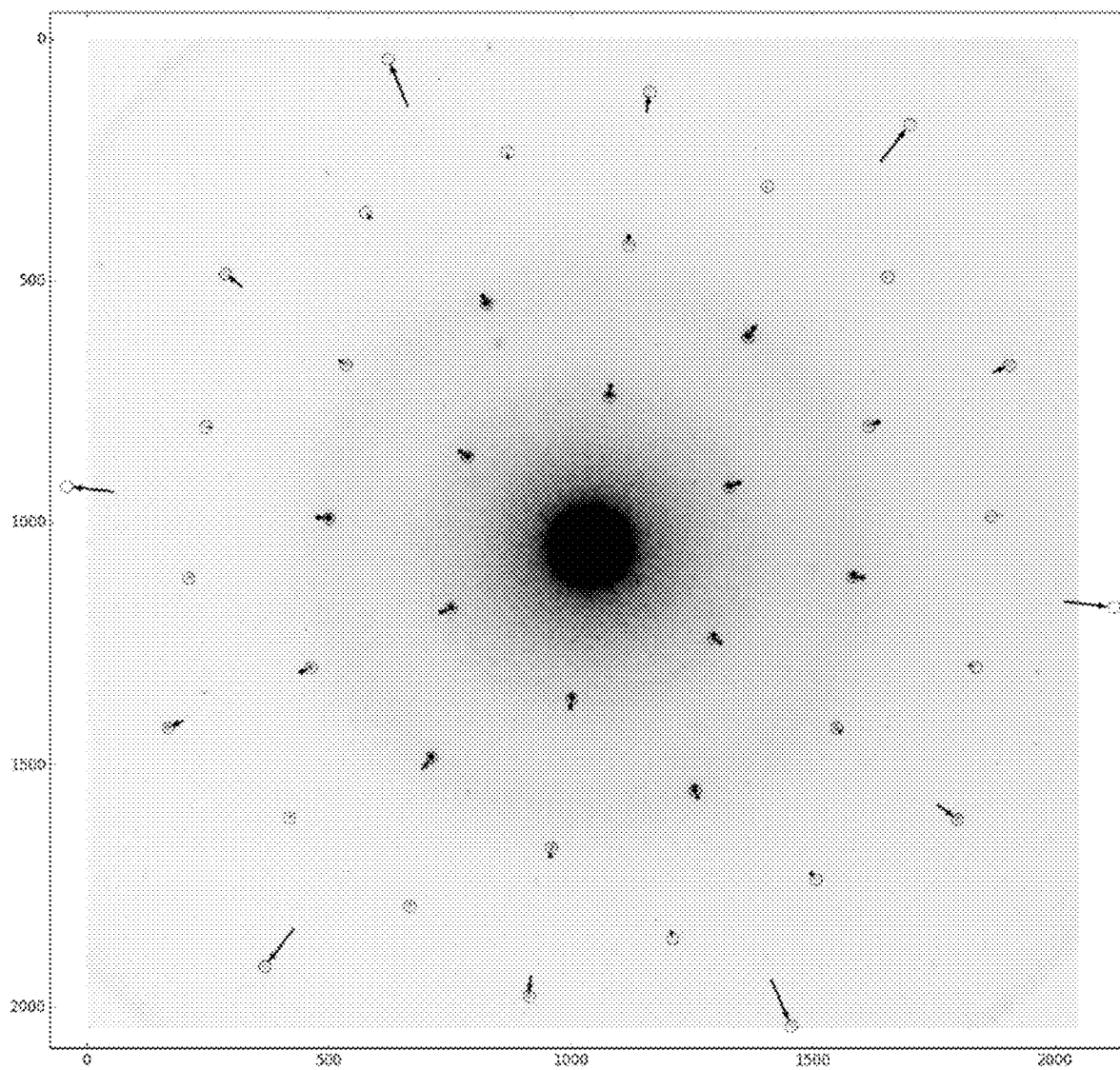
FIG. 8 is the CEDI image of FIG. 7A on which is overlayed arrows indicative of the direction and distance that each of the reflections shown in the image would need to be displaced to be at its correct location in the absence of the lens distortion.

The fitting of Equation (4) to the calculated ratios from FIG. 7D and the observed pixel positions (x,y) is shown in FIG. 7E. As shown, the resulting values for the coefficients are a=1.167, b=−0.00009, c=−0.017 and d=−0.36. The resulting values for the beam center coefficients are $c_x$=1021 and $c_y$=1025. With these values, fitted ratios can then be determined for each of the reflections, as shown in FIG. 7F. Thus, FIG. 7D shows the observed ratios and FIG. 7F shows the fitted ratios. The Fit column in FIG. 7F shows the observed ratios divided by the fitted ratios and indicates the quality of the fit. These fitted ratios indicate for each reflection the magnitude of the displacement of that reflection away from or towards the beam center due to lens distortion. This is shown visually in the version of the FIG. 7A CEDI image shown in FIG. 8, on which are overlayed arrows indicative of the direction and distance that each of the reflections shown in the image would need to be displaced to be at its correct location in the absence of the lens distortion. That is, the corrected positions of the graphene reflections are indicated by circles, with the arrows pointing from what was their distorted (observed) positions. As coefficient b is close to zero, it can be seen that this particular example represents primarily an elliptical distortion.

Once the distortion correction is known, it may be applied to the entire image, and therefore provides correction of image components related to other materials examined together with the graphene, such as a sample of interest mounted on a graphene substrate. Although both the sample and the secondary material are typically imaged together, it may also be possible to collect an image of just the secondary material by moving the electron beam to a region in which no sample material is present, and then use this image to calibrate the distortion function to be used for an image collected of the sample and secondary material together. Once a correction for the lens distortion is obtained, it may be applied to an unknown material based on the characteristics of the distortion determined by the examination of the secondary material, in this case graphene.

Although graphene was the material chosen for the present embodiment, those skilled in the art will understand that other materials with known characteristics may also be used for the characterization of a lens distortion when they are examined together with a sample of interest. One alternative material, for example, is silicon nitride. Although it is a three-dimensional crystal, and not two-dimensional like graphene, a similar process of finding predicted reflection positions and fitting Equation (4) to determine the coefficients indicative of the nature of the distortion may be used. However, such a 3D crystal would need to be aligned with the symmetry axis parallel to the electron beam.

Figure 9:
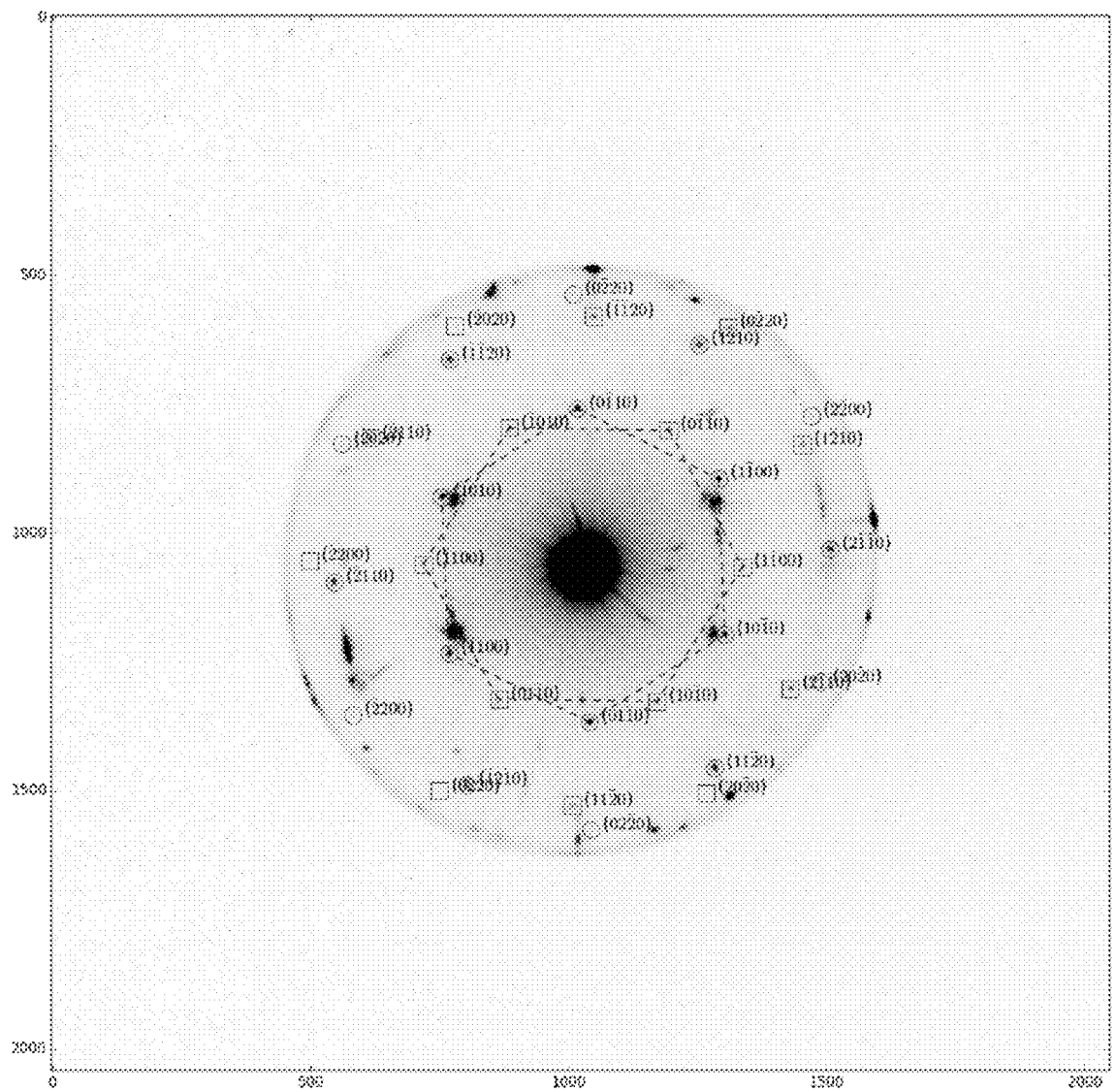
FIG. 9 is a CEDI image of a gold nanocrystal supported by two layers of graphene.

In another embodiment of the invention, more than one layer of secondary material may be used. Shown in FIG. 9 is a CEDI image of a gold nanocrystal supported by two layers of graphene. As shown, this creates two sets of graphene reflections, each associated with a different graphene layer. The reflections of these two graphene domains are distinguished in the figure by circles and squares, respectively, adjacent to which are shown their Bravais-Miller indices.

When using multiple layers of secondary material, as in FIG. 9, the method according to the invention proceeds in the same manner, with the additional layer providing an additional set of reflections for characterizing the distortion imparted by the projection lens. Those skilled in the art will recognize that the two layers must be evaluated separately with regard to establishing the predicted positions of the reflections, but both sets of reflections may be used for finding the beam center and fitting Equation (4) for finding the coefficients a, b, c, d, $c_x$ and $c_y$.

Figure 10:
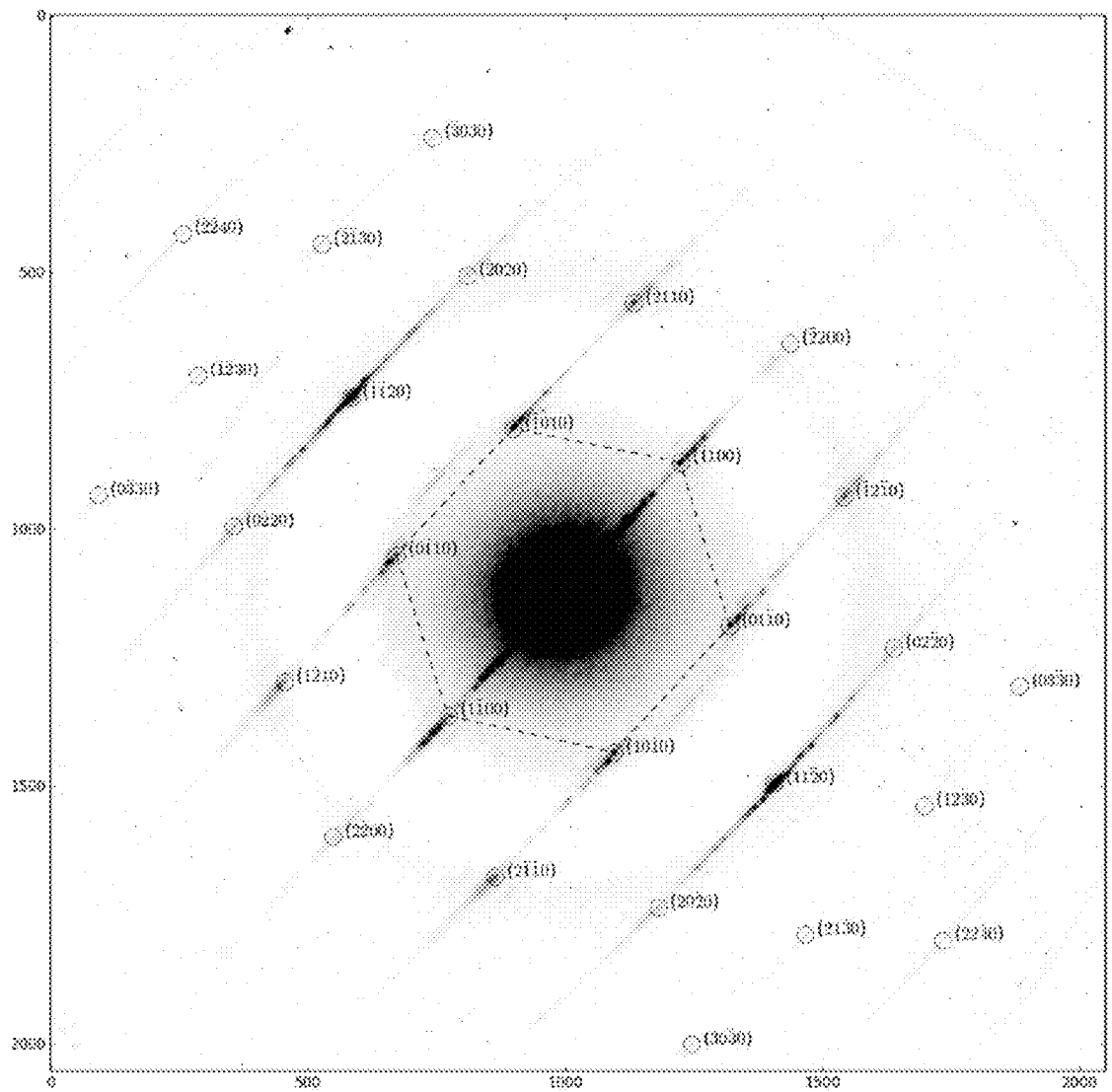
FIG. 10 is a CEDI image of a freestanding carbon nanotube.

In another embodiment, characterization of a lens distortion may be done using reflections of a known material that may be intrinsic to a sample of interest. FIG. 10 shows a CEDI image of a freestanding carbon nanotube, which will inherently produce reflections corresponding to the graphene contained therein. In the figure, the graphene reflections are indicated by circles, adjacent to which are their respective Bravais-Miller indices. As in the foregoing embodiments, the predicted reflection positions can be used to determine the displacement of the reflections in the image due to lens distortion, and the fitting of Equation (4) provides the coefficients for characterizing the distortion. Correction of the overall image can then be performed accordingly.

The invention claimed is:

1. A method of correcting a distortion imparted to a diffraction image of a sample of interest by a projection lens in a coherent electron diffraction imaging (CEDI) system, the method comprising:
   a) obtaining a CEDI image of the sample of interest together with a secondary material having a known lattice structure;
   b) locating within the image the observed position of reflections corresponding to the secondary material;
   c) identifying unit cell vectors for the secondary material;
   d) determining a predicted position for each secondary material reflection corresponding to a respective Bravais-Miller index assigned thereto based on the unit cell vectors and the known lattice structure of the secondary material; and
   e) using differences between observed positions and predicted positions of secondary material reflections to relocate image components within the CEDI image.

2. A method according to claim 1 wherein the secondary material comprises graphene.

3. A method according to claim 1 wherein identifying unit cell vectors comprises finding difference vectors for pairs of the CEDI reflections corresponding to the secondary material and grouping the difference vectors according to length and direction, averaging the vectors of each group and selecting the shortest averaged group vectors having a similar length as the unit cell vectors.

4. A method according to claim 1 wherein determining a predicted position for each secondary material reflection comprises finding a linear combination of the unit cell vectors that corresponds to a position in the image proximate to the observed position of that reflection.

5. A method according to claim 1 wherein said differences between observed positions and predicted positions of secondary material reflections are found relative to a beam center location in the image.

6. A method according to claim 5 wherein said beam center location is found by averaging centroids of Friedel pairs using the observed positions of the secondary material reflections.

7. A method according to claim 5 wherein, for each secondary material reflection, a ratio is found between a distance of an observed reflection to the beam center location and a distance of a predicted reflection to the beam center location, and said ratios are used to characterize the distortion within the image relative to the beam center location.

8. A method according to claim 7 wherein said ratios and observed secondary material reflection positions are used to determine coefficients a, b, c, d, $c_x$ and $c_y$ that best satisfy the equation:

$$f(x, y) = a + b*\sqrt{(x-c_x)^2 + (y-c_y)^2} + c*\sin\left(2*\tan^{-1}\left(\frac{y-c_y}{x-c_x}\right) + d\right) \quad (4)$$

for each of said ratios and observed secondary material reflection positions, where $c_x$ and $c_y$ represent the x and y coordinates of the beam center location, said equation with said determined coefficients being used in said relocating of image components.

9. A method according to claim 8, wherein a least squares refinement is used to fit said equation to said ratios and observed secondary material reflection positions.

10. A method according to claim 8 wherein revised x and y values for a pixel location in the image are determined as follows:

$$x_{rev} = (x-c_x)/f(x, y) + c_x \quad (5)$$

$$y_{rev} = (y-c_y)/f(x, y) + c_y \quad (6)$$

where $x_{rev}$ and $y_{rev}$ are, respectively, the revised x and y pixel values, x and y are, respectively, the original pixel values, and f(x,y) is a calculated version of Equation (4) using the determined coefficients.

11. A method according to claim 1 wherein the CEDI image is a first CEDI image, and wherein the method further comprises obtaining a plurality of CEDI images of the sample of interest together with the secondary material at a plurality of incidence angles, reflections from each of the images being used in the method after being corrected for position variations due to angle of incidence.

12. A method according to claim 1 wherein the secondary material comprises a plurality of layers each of which generates separate reflections that are used in the method.

13. A method according to claim 1 wherein the secondary material comprises a substrate on which the sample is located.

14. A method according to claim 1 wherein the secondary material is part of the sample.

* * * * *